(12) United States Patent
Bauch et al.

(10) Patent No.: US 7,579,570 B2
(45) Date of Patent: Aug. 25, 2009

(54) HIGH-VOLTAGE OUTDOOR BUSHING CONFIGURATION

(75) Inventors: Ulrich Bauch, Berlin (DE); Manfred Meinherz, Berlin (DE); Eckard Wagner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 122 days.

(21) Appl. No.: 10/587,699

(22) PCT Filed: Jan. 21, 2005

(86) PCT No.: PCT/DE2005/000117

§ 371 (c)(1),
(2), (4) Date: Jul. 27, 2006

(87) PCT Pub. No.: WO2005/074085

PCT Pub. Date: Aug. 11, 2005

(65) Prior Publication Data

US 2007/0151952 A1    Jul. 5, 2007

(30) Foreign Application Priority Data

Jan. 30, 2004    (DE) ...................... 10 2004 006 061

(51) Int. Cl.
*H01H 33/42* (2006.01)

(52) U.S. Cl. .............................. 218/45; 218/78; 218/84

(58) Field of Classification Search ................. 218/2–7, 218/912–14, 43–45, 55, 58, 71, 78, 80, 84, 218/140, 153, 154; 200/48 R
See application file for complete search history.

(56) References Cited

U.S. PATENT DOCUMENTS

| 4,130,850 A | 12/1978 | Cronin et al. |
| 4,255,632 A | 3/1981 | Backskog |

(Continued)

FOREIGN PATENT DOCUMENTS

CN    1373921 A    10/2002

(Continued)

OTHER PUBLICATIONS

Chinese Office Action received on May 18, 2009.

*Primary Examiner*—Elvin G Enad
*Assistant Examiner*—Marina Fishman
(74) *Attorney, Agent, or Firm*—Laurence A. Greenberg; Werner H. Stemer LLP; Ralph E. Locher

(57) ABSTRACT

A high-voltage outdoor bushing configuration includes an electrically insulating casing and an electrically conductive housing. An isolating gap is located inside the electrically conductive housing. The isolating gap interrupts a phase conductor into first and second sections. A switching piece or an element of a multi-part switching piece can be moved at an angle relative to an axis along which the phase conductor extends.

12 Claims, 3 Drawing Sheets

U.S. PATENT DOCUMENTS

| | | | |
|---|---|---|---|
| 4,300,028 A * | 11/1981 | Cronin et al. | 200/252 |
| 5,668,360 A | 9/1997 | Perret et al. | |
| 5,796,060 A * | 8/1998 | Fuchsle et al. | 218/79 |
| 5,828,025 A | 10/1998 | Neumaier et al. | |
| 5,841,087 A | 11/1998 | Füchsle et al. | |
| 6,127,641 A | 10/2000 | Meinherz | |
| 6,538,224 B2 | 3/2003 | Furuta et al. | |
| 6,545,241 B1 * | 4/2003 | Franchi et al. | 218/78 |
| 6,573,469 B1 * | 6/2003 | Piazza | 218/7 |
| 6,680,453 B2 * | 1/2004 | Rokunohe et al. | 218/2 |
| 6,784,392 B1 | 8/2004 | Piazza et al. | |
| 2002/0056704 A1 | 5/2002 | Furuta et al. | |
| 2002/0104827 A1 | 8/2002 | Rokunohe et al. | |

FOREIGN PATENT DOCUMENTS

| | | |
|---|---|---|
| DE | 297 00 930 U1 | 5/1997 |
| DE | 196 32 474 A1 | 2/1998 |
| EP | 0 721 197 A1 | 7/1996 |
| WO | WO/0120736 | 3/2001 |

* cited by examiner

HIGH-VOLTAGE OUTDOOR BUSHING CONFIGURATION

CROSS-REFERENCE TO RELATED APPLICATION

The present application is the National Stage of, and claims priority from, International PCT Patent Application No. PCT/DE2005/000117, filed on Jan. 21, 2005, and designating the United States, which application claimed priority from German Patent Application No. 10 2004 006 061.4, filed on Jan. 30, 2004.

BACKGROUND OF THE INVENTION

Field of the Invention

The invention relates to a high-voltage outdoor bushing arrangement having an electrically insulating casing and switch-disconnector module which extends along an axis has an electrically conductive housing, with a phase conductor which can be interrupted into a first section and a second section by means of an isolating gap and through the bushing arrangement.

A high-voltage outdoor bushing arrangement such as this is known, for example, from U.S. Pat. No. 6,538,224 B2. The arrangement there has a switch-disconnector module with a separate gas area. The isolating gap is aligned along the phase conductor, which can be interrupted into two sections. In addition, one section of the phase conductor can be grounded by means of a grounding switch. This design allows the switch-disconnector module to be inserted into flange connections. In order to ensure that the switch-disconnector module can be inserted easily between a flange, a conventional switch-disconnector arrangement must be used. In consequence, the switch-disconnector module has a relatively large volume.

SUMMARY OF THE INVENTION

The present invention is based on the object of specifying a high-voltage outdoor bushing arrangement which has a compact switch-disconnector module and a compact overall volume.

In the case of a high-voltage outdoor bushing arrangement of the type mentioned initially, the object is achieved according to the invention in that a switching piece or an element of a multiple part switching piece can be moved at an angle to the axis.

The movement of the switching piece along an inclined movement path results in better utilization of the space in the interior of the electrically conductive housing. The inclined position makes better use of the cross section of the housing, which is governed by the flange openings, so that it is possible to reduce the length in the direction of the axis. On the one hand, this shortens the electrically conductive housing, while on the other hand it reduces the overall length of the high-voltage outdoor bushing. Alternatively, additional space is available in the interior while retaining the previous housing size, in order by way of example to arrange further components within the housing.

It is also advantageously possible to provide for the capability to ground at least one of the sections by means of a grounding switch, which is arranged within the electrically conductive housing, by continuation of a further movement of the switching piece.

The space which is obtained by the inclined position of the movement path of the switching piece can advantageously be used, for example, to arrange a grounding switch. This grounding switch may be in the form of a combination with the switch disconnector, in order to further minimize the physical space required. It is particularly advantageous in this case for the movable contact piece of the isolating gap and a movable contact piece of the grounding switch to be moved by a common drive. For example, it is thus possible to provide for the switching piece to move along an inclined path, and to be in the form of a bolt. The bolt has contact areas at each of its two ends, in which case one end can be used for switching the switching path, and the other end can be used for switching the grounding switch. It is also possible to provide for the switching piece to be in the form of a plurality of parts, for example composed of a plurality of elements which are connected to one another such that they can move and are electrically coupled to one another. By way of example, an embodiment of the switching piece in the form of elements such as these also allows movements on curved paths.

It is advantageously also possible to provide for the movable switching piece to be driven via a shaft which passes through the essentially cylindrical housing.

An essentially cylindrical shape of the housing allows flexible arrangement of the shaft for driving the movable switching piece. The rotation axis of the shaft may, for example, be arranged radially with respect to the axis. Alternatively, it is also possible to provide for the axis to be skewed with respect to the rotation axis of the shaft. If the drive for the switching piece and the grounding switch are combined, only one common shaft is required, and this passes through the housing. This simplifies the housing design.

It is advantageously also possible to provide for the contact piece to be in the form of a blade contact.

Switch disconnectors are intended to produce safe isolating gaps in a phase conductor. As such, the contact systems of switch disconnectors are subject only to a minor load resulting from switching arcs, since the switch disconnectors are switched with no current flowing. Blade contacts represent a cost-effective variant for a switching contact. One particularly simple embodiment in this case is for the blade contacts to move on a pivoting path and to be able to move into mating contacts in the form of slots.

It is also advantageously possible to provide for the contact piece to be in the form of a pin.

In comparison to blade contacts, contacts in the form of pins require increased manufacturing effort. Despite the fact that switch disconnectors are switched with no current flowing, it is possible for arcs to occur on isolating switching contacts as well, for example because of charging phenomena. Contacts in the form of pins are more resistant to arc loads.

It is also advantageously possible to provide for the isolating gap to be held in the housing via pillar supports.

The use of pillar insulators to hold the isolating gap allows the isolating gap to be arranged very flexibly within the encapsulating housing. Furthermore, the supporting insulators allow an insulating gas to flow around comprehensively and to flow through the encapsulating housing. By way of example, the use of supporting insulators makes it possible to dispense with the use of partition insulators. If there are no sections which need to be partitioned, this increases the available volume of insulating gas within a gas area. This improves the cooling of the contact areas of the switch disconnector.

It is also advantageously possible to provide for the contact piece to be able to move on a curved path.

A curved path such as this allows switching movements to be carried out even in the immediate vicinity of the wall of the encapsulating housing. A curved path movement such as this may be achieved, for example, by the contact piece being designed in the form of elements. Furthermore, a curved path can also be achieved by pivoting a contact piece around a pivoting axis. Better utilization of the available space makes it possible, for example, to reduce the volume of the encapsulating housing, or else to increase the current carrying capacity of the high-voltage outdoor bushing arrangement.

It is advantageously also possible to provide for the shaft to pass through an outer wall of the housing in a cylindrical area of the housing.

Arrangement of the shaft in the cylindrical area of the encapsulating housing allows the drive movement to be introduced into the encapsulating housing relatively centrally. The isolating switch or else the grounding switch can then be arranged around this introduction point.

One exemplary embodiment of the invention will be described in more detail in the following text and is illustrated schematically in a drawing, in which:

DESCRIPTION OF THE PREFERRED EMBODIMENTS

Figure 1:
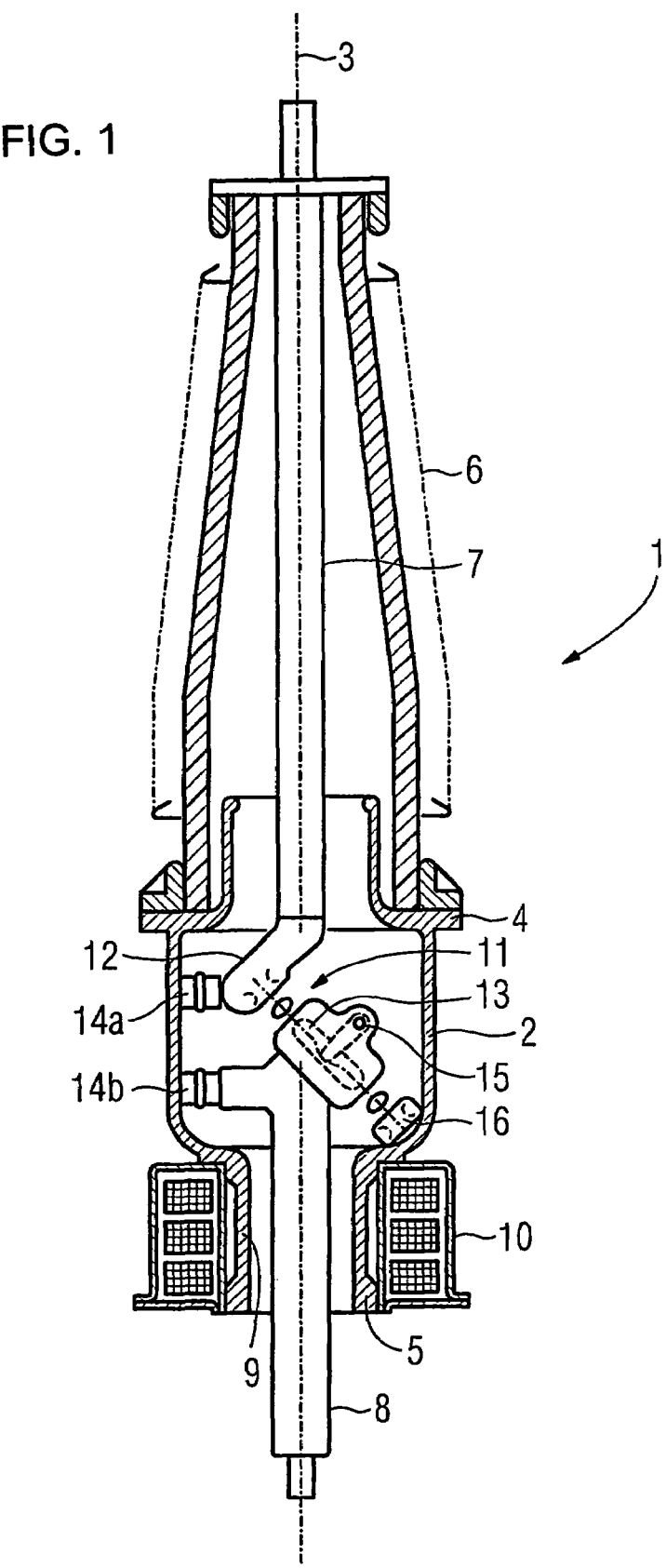
FIG. 1 shows a first embodiment variant of a high-voltage outdoor bushing arrangement.
Figure 2:
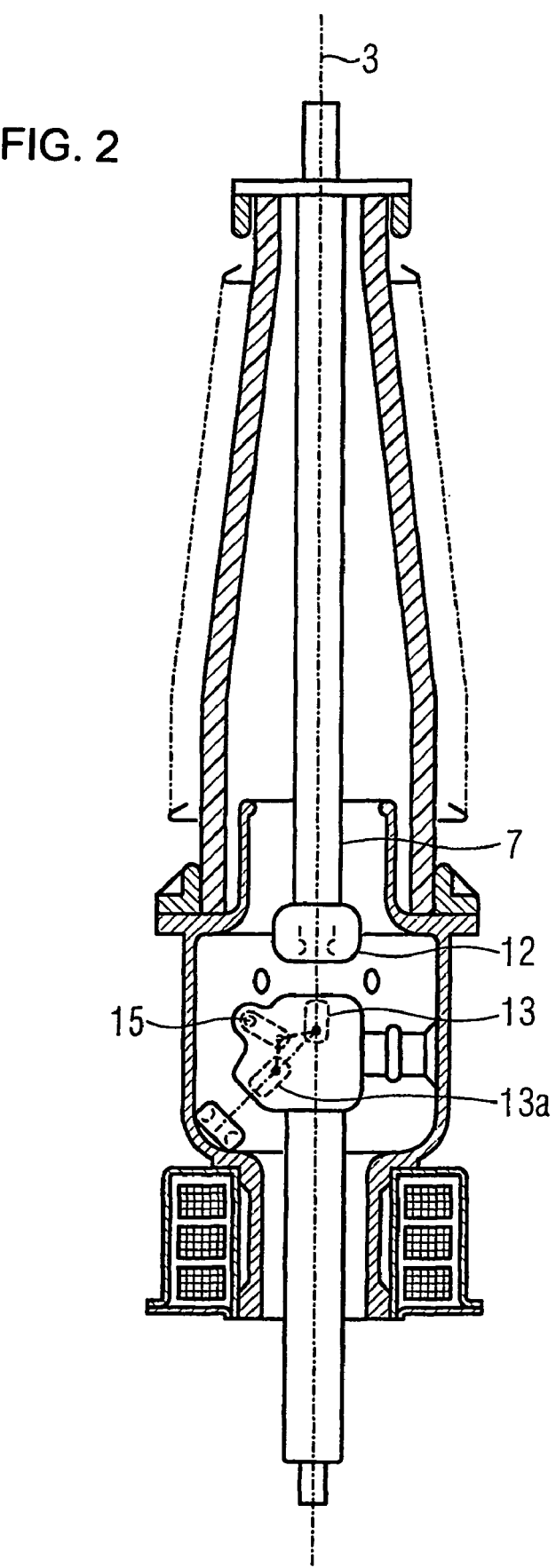
FIG. 2 shows a second embodiment variant of a high-voltage outdoor bushing.
Figure 3:
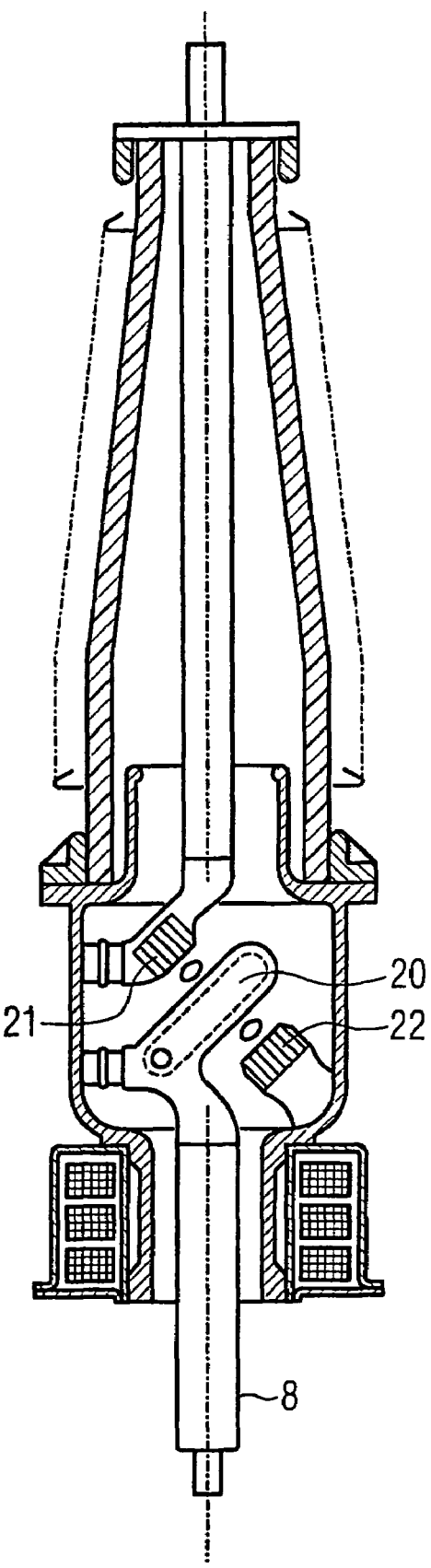
FIG. 3 shows a third embodiment variant of a high-voltage outdoor bushing.

The high-voltage outdoor bushings illustrated in FIGS. 1, 2 and 3 are designed identically. Only the configuration of the isolating gaps differ from one another.

First of all, the basic design of a high-voltage outdoor bushing will be explained with reference to the exemplary embodiment illustrated in FIG. 1. The high-voltage outdoor bushing 1 has an electrically conductive housing 2. The electrically conductive housing 2 is manufactured, for example, from aluminum or from some other metal. The electrically conductive housing 2 is preferably produced by means of a casting process. The housing 2 is arranged essentially rotationally symmetrically around an axis 3. The electrically conductive housing 2 has a first flange 4 and a second flange 5. The first and the second flange 4, 5 are likewise arranged coaxially with respect to the axis 3. An insulating casing 6 is flange-connected to the first flange 4. The insulating casing 6 is in the form of an outdoor bushing, in a known manner. The electrically insulating casing 6 and the housing 2 surround a common gas area, which is filled with an insulating gas. The insulating casing 6 is arranged coaxially with respect to the axis 3. Furthermore, an electrical phase conductor is arranged coaxially with respect to the axis 3. The electrical phase conductor has a first section 7 and a second section 8. The first section 7 of the phase conductor is surrounded by the insulating casing 6, and is passed to the exterior of the free end of the insulating casing 6. The first section 7 of the phase conductor is passed through the first flange 4 into the interior of the electrically conductive housing 2. The second section of the phase conductor is passed through the second flange 5 into the interior of the electrically conductive housing 2. The second flange 5 is arranged at the end of a tubular connecting stub 9. The tubular connecting stub 9 is likewise arranged coaxially with respect to the axis 3. The tubular connecting stub 9 is surrounded by a toroidal current transformer 10. An isolating gap 11 is arranged in the interior of the electrically conductive housing 2. The isolating gap 11 is formed from a fixed-position contact piece 12 and movable contact piece 13. The fixed-position contact piece 12 is electrically conductively connected to the first section 7 of the phase conductor, which passes through the first flange 4. The fixed-position contact piece 12 as well as the first section 7 of the phase conductor are held in an isolated manner in the interior of the housing 2 via a supporting insulator 14a in the form of a pillar. The second section 8 of the phase conductor, which is passed through the second flange 5, is likewise mounted in an isolated manner in the interior of the electrical housing 2 by means of a further supporting insulator 14b in the form of a pillar. The movable contact piece 13 is in the form of a bolt. The bolt can be moved along its bolt longitudinal axis, along a linear path at an angle to the axis 3. In order to drive the movable contact piece 13, a shaft 15 is passed through the wall of the electrically conductive housing 2 in a cylindrical area of it. The shaft 15 is in the form of an electrically insulating shaft. The rotary movement of the shaft 15 is converted to a linear movement of the movable contact piece 13 via a rocker which is arranged on the shaft 15. At its end-face end, the movable contact piece 13 has a contact area which can be inserted into the fixed-position contact piece 12 of the isolating gap 11. A contact area is arranged at that end of the movable contact piece 13 which is remote from the isolating gap 11 and can be inserted into a grounding contact 16 which is arranged in the interior of the electrically conductive housing 2. As the opening movement of the movable contact piece 13 continues, contact is made with the grounding contact 16. This allows the second section 8 of the phase conductor to be grounded.

The high-voltage outdoor bushing arrangement illustrated in FIG. 2 has a design which is the same as that shown in FIG. 1 in terms of the electrically conductive housing 2 and the insulating casing 6, as well as the flanges 4, 5. The only modification from FIG. 1 is the contact system for the isolating gap. The fixed-position contact piece 12 is once again arranged on the first section 7 of the phase conductor. The movable contact piece 13 is in the form of a bolt with a plurality of elements and can be moved along the axis 3. The movable contact piece 13 is driven via a shaft 15 which passes through the wall of the electrically conductive housing 2. The movable contact piece 13 is formed in two parts. The movable contact piece 13 has a grounding contact 13a in the form of a bolt. The grounding contact 13a in the form of a bolt can move along a movement path which is arranged at an angle to the axis 3. In this case, the movable contact piece can be driven in such a way that a connecting rod in each case strikes against the free end of a rocker which is connected to the shaft 15, and this connecting rod is in each case connected to the movable contact piece 13 and to the grounding contact 13a. The connecting rod converts the rotary movement to respective linear movements, respectively along the axis 3 and transversely with respect to the axis 3, thus resulting in a curved path being formed. FIG. 3 shows a high-voltage outdoor bushing arrangement which has an isolating gap 11 formed by a blade contact 20 which can pivot. The blade contact 20 which can pivot is mounted on the second section 8 of the phase conductor, such that it can rotate. A first striking contact 21 is arranged on the first section 7 of the phase conductor. The isolating gap 11 is closed during a pivoting movement of the blade contact 20 as it is knocked into the first striking contact 21. Furthermore, a grounded second striking contact 22 is arranged in the interior of the electrically conductive housing 2. During the opening movement of the isolating gap as this pivoting movement continues beyond a neutral position of the blade contact 20, this is knocked into the second striking contact 22, and thus grounds the second section 8 of the phase conductor. In its neutral position, the blade contact 20 is covered by shielding shrouds which make electrical contact with the second section 8 of the phase conductor.

We claim:

1. A high-voltage outdoor bushing configuration, comprising:
   - an axis extending through the outdoor bushing configuration;
   - an electrically insulating casing;
   - a switch-disconnector module having an electrically conductive housing, said electrically conductive housing being substantially cylindrical and extending coaxially around said axis;
   - a phase conductor extended along said axis and to be interrupted by an isolating gap into a first section and a second section; and
   - a switching piece or an element of a multi-part switching piece to be moved at an angle relative to said axis, said switching piece being driven by a shaft passing through said substantially cylindrical electrically conductive housing.

2. The high-voltage outdoor bushing configuration according to claim 1, which further comprises a grounding switch disposed within said electrically conductive housing, said grounding switch grounding at least one of said sections by continuation of a further movement of said switching piece.

3. The high-voltage outdoor bushing configuration according to claim 1, wherein said switching piece is a blade contact.

4. The high-voltage outdoor bushing configuration according to claim 1, wherein said switching piece is pin-shaped.

5. The high-voltage outdoor bushing configuration according to claim 1, which further comprises pillar supports holding said isolating gap in said housing.

6. The high-voltage outdoor bushing configuration according to claim 1, wherein said switching piece is movable on a curved path.

7. A high-voltage outdoor bushing configuration, comprising:
   - an axis extending through the outdoor bushing configuration;
   - an electrically insulating casing;
   - a switch-disconnector module having an electrically conductive housing, said electrically conductive housing being substantially cylindrical and including a substantially cylindrical outer wall;
   - a phase conductor extending along said axis and interrupted by an isolating gap into a first section and a second section; and
   - a switching piece or an element of a multi-part switching piece to be moved at an angle relative to said axis, said switching piece being driven by a shaft passing through the substantially cylindrical outer wall of said electrically conductive housing.

8. The high-voltage outdoor bushing configuration according to claim 7, which further comprises a grounding switch disposed within said electrically conductive housing, said grounding switch grounding at least one of said sections by continuation of a further movement of said switching piece.

9. The high-voltage outdoor bushing configuration according to claim 7, wherein said switching piece is a blade contact.

10. The high-voltage outdoor bushing configuration according to claim 7, wherein said switching piece is pin-shaped.

11. The high-voltage outdoor bushing configuration according to claim 7, which further comprises pillar supports holding said isolating gap in said housing.

12. The high-voltage outdoor bushing configuration according to claim 7, wherein said switching piece is movable on a curved path.

* * * * *